Jan. 21, 1936.　　　　E. NORDBY　　　2,028,470
ROLLING MACHINE
Filed Jan. 9, 1935
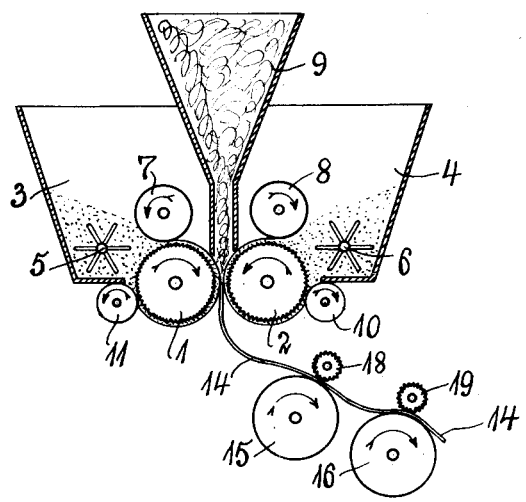

Patented Jan. 21, 1936

2,028,470

UNITED STATES PATENT OFFICE 2,028,470

ROLLING MACHINE

Emil Nordby, Hamar, Norway

Application January 9, 1935, Serial No. 1,038
In Germany March 5, 1934

7 Claims. (Cl. 107—12)

The present invention relates to a method of and a machine for rolling out a dough-like mass into a continuous sheet or band and for the heat treatment or drying or baking of this sheet, or band, and it is applicable to the manufacture of "Knäkkebrot", "flat bread", biscuits or other hard bread and for other purposes.

The object of the invention is to provide mechanical means capable of serving in an effective and reliable manner for rolling out a dough-like mass into a broad and comparatively thin strip or sheet, the thickness of which practically does not vary at all anywhere. Many processes have already been proposed for this purpose, one such process consisting in introducing the dough-like mass between two revolving rollers arranged close together. In order to prevent the dough sticking to these rollers, it is necessary that they should constantly be cleaned and be covered with a thin layer of a non-sticky substance or powder, such as flour for instance. In many cases it is of exceedingly great importance that the strip of dough to be rolled out should maintain exactly a definite thickness throughout its entire breadth. In making bread, such as thin flat bread, for instance, quite small thicknesses, of half a millimetre or less for example, are involved, while at the same time the breadth of the sheet of dough to be produced may be more than a metre.

In consequence of this a slight irregularity in the layer on these rollers will immediately result in the product to be made being less valuable. Moreover, the work would have to be stopped immediately if any dough stuck to the rollers.

The present invention comprises amongst other things the provision of such a construction of a rolling mechanism for the dough as to ensure at all times that the strip of dough rolled out will be completely homogeneous, and that the dough will not stick to the rollers.

According to the invention this problem is solved primarily by the provision of means for ensuring that the rollers are coated with a completely uniform layer of a non-sticky material, such as flour for example, or some other powder.

The invention accordingly consists in means for rolling out a mass of dough into a continuous strip, and comprises two oppositely rotating rollers sprinkled with powder and arranged a short distance apart through which the dough passes, and the invention is characterized by the fact that the surfaces of these rollers run through a chamber, which is adapted to be filled with a suitable powder, and that at the point where the cylinder surface comes out of the said chamber a strickle or scraping device constructed as a cylinder is provided, which revolves at a peripheral speed which is less than the peripheral speed of the rollers that roll out the dough.

According to a further feature of the invention the rollers are constructed with a rough surface for the purpose of ensuring the adhesion of the flour or other powder. Furthermore means are provided for returning the flour or other powder into the chamber after it has become detached from the rollers.

In order furthermore to cause the said powder at all times to come into contact with the rollers, which pass through the chamber, according to a further feature of the invention a stirring mechanism is provided in the powder chamber, which keeps the powder in movement all the time.

In order to facilitate the comprehension of the invention, it is described hereunder with reference to a constructional example illustrated in the accompanying drawing in which:—

The figure is a diagrammatic sectional elevation of a rolling machine designed for baking flat bread.

Further important novel features of the invention will be gathered from the ensuing description. 1 and 2 are two rolling-out rollers, which are arranged at the same level, but at a short distance from one another, and which revolve in opposite directions when mechanically operated, as indicated by arrows in the figure.

The rollers 1 and 2 have rough surfaces. At the backs of these rollers are provided flour chambers 3 and 4. Part of the periphery of the rollers 1 and 2 forms part of the wall of these flour chambers. In the flour chambers are provided stirring mechanisms 5 and 6, which are mechanically driven and which keep the flour in motion. Where the peripheries of the rollers 1 and 2 cease to form the walls of the flour chambers 3 and 4, cylinders 7 and 8 are provided, which are mechanically driven, and which revolve in the directions indicated by arrows. The cylinders 7 and 8 extend throughout the entire length of the rollers 1 and 2, and are so supported that they are strong enough not to bend throughout their length or else they are so supported that bending is prevented. The mechanical driving of the rollers 7 and 8 is so connected with the driving appliances of the machine that the peripheral speed of these cylinders is somewhat less than the peripheral speed of the rollers 1 and 2. Above the gap between the rollers 1 and 2 is provided a hopper or feeding device 9 for the dough that is to be rolled out. On the under side of the rollers 1 and 2 are provided mechanically driven cylinders 10 and 11, which revolve in the directions indicated by arrows. These cylinders 10 and 11 extend practically to the periphery of the rollers 1 and 2. The flour detached from the rollers 1 and 2 falls on the cylinders 10 and 11, and is pressed back by the latter towards the powder chambers 3 and 4.

The rolled-out strip of dough 14 is guided, as described above, from the rolling apparatus over suitable cylinders 15 and 16 to a baking oven or the like.

Although the invention has been described above primarily in conjunction with a machine for making thin flat bread or the like, it is obvious that the machine can be employed with very slight modifications for the production of any desired strip-shaped or plate-shaped products, where the production comprises the rolling out of dough-like masses, and the heat treatment or drying of such masses.

I claim:—

1. Means for rolling out a mass of dough between two oppositely rotating, non-sticking powder sprinkled rollers, arranged a short distance apart, comprising powder chambers through which the surfaces of the said rollers pass, rotatably mounted strickle devices at that point where the said surfaces leave the said chambers and means to rotate the said strickle devices with a surface speed less than the surface speed of the said rollers, but in the same direction as these latter.

2. Means for rolling out a mass of dough between two opposite rotating, non-sticking powder sprinkled rollers, arranged a short distance apart, comprising powder chambers through which the surfaces of the said rollers pass, rotatably mounted strickle devices in the form of solid, smooth cylinders extending the full length of the rollers at that point where the said surfaces leave the said chambers and means to rotate the said strickle devices with a surface speed less than the surface speed of the said rollers, but in the same direction as these latter.

3. Means for rolling out a mass of dough between two oppositely rotating, non-sticking powder sprinkled rollers, arranged a short distance apart, comprising powder chambers through which the surfaces of the said rollers pass, rotating powder feeding cylinders being arranged at that point where the rollers enter the chambers.

4. Means for rolling out a mass of dough between two oppositely rotating, non-sticking powder sprinkled rollers, arranged a short distance apart, comprising powder chambers through which the surfaces of the said rollers pass, rotatably mounted strickle devices at that point where the said surfaces leave the said chambers and means to rotate the said strickle devices with a surface speed less than the surface speed of the said rollers, rotating powder feeding cylinders being arranged at that point where the rollers enter the chambers.

5. Means for rolling out a mass of dough between two oppositely rotating, non-sticking powder sprinkled rollers, arranged a short distance apart, comprising powder chambers through which the surfaces of the said rollers pass, rotatably mounted strickle devices in the form of cylinders extending the full length of the rollers at that point where the said surfaces leave the said chambers and means to rotate the said strickle devices with a surface speed less than the surface speed of the said rollers, rotating powder feeding cylinders being arranged at that point where the rollers enter the chambers.

6. Means for rolling out a mass of dough between two oppositely rotating, non-sticking powder sprinkled rollers arranged a short distance apart, comprising powder chambers through which the surfaces of the said rollers pass, stirring agitators in the said chambers, rotatably mounted strickle devices in the form of cylinders extending the full length of the rollers at that point where the said surfaces leave the said chambers and means to rotate the said strickle devices with a surface speed less than the surface speed of the said rollers, rotating powder feeding cylinders being arranged at that point where the rollers enter the chambers.

7. Means for rolling out a mass of dough between two oppositely rotating, non-sticking powder sprinkled rollers, arranged a short distance apart, comprising powder chambers through which the surfaces of the said rollers pass, stirring agitators in the said chambers, rotatably mounted strickle devices at that point where the said surfaces leave the said chambers and means to rotate the said strickle devices with a surface speed less than the surface speed of the said rollers, rotating powder feeding cylinders being arranged at that point where the rollers enter the chambers.

EMIL NORDBY.